United States Patent
Belgaied

(10) Patent No.: US 7,743,143 B2
(45) Date of Patent: Jun. 22, 2010

(54) DIAGNOSABILITY ENHANCEMENTS FOR MULTI-LEVEL SECURE OPERATING ENVIRONMENTS

(75) Inventor: Kais Belgaied, San Jose, CA (US)

(73) Assignee: Oracle America, Inc., Redwood Shores, CA (US)

( * ) Notice: Subject to any disclaimer, the term of this patent is extended or adjusted under 35 U.S.C. 154(b) by 992 days.

(21) Appl. No.: 10/139,099

(22) Filed: May 3, 2002

(65) Prior Publication Data

US 2003/0208597 A1 Nov. 6, 2003

(51) Int. Cl.
*G06F 15/173* (2006.01)
(52) U.S. Cl. .................. 709/225; 709/223; 709/224; 713/201
(58) Field of Classification Search .......... 709/223, 709/224, 225; 714/712, 745, 43, 48, 56, 714/57, 746; 713/201, 202
See application file for complete search history.

(56) References Cited

U.S. PATENT DOCUMENTS

| | | | | |
|---|---|---|---|---|
| 5,923,840 A | * | 7/1999 | Desnoyers et al. | 714/48 |
| 6,026,326 A | * | 2/2000 | Bardy | 607/40 |
| 6,125,454 A | * | 9/2000 | Mossner et al. | 714/4 |
| 6,260,158 B1 | * | 7/2001 | Purcell et al. | 714/10 |
| 6,330,572 B1 | * | 12/2001 | Sitka | 707/205 |
| 6,397,244 B1 | * | 5/2002 | Morimoto et al. | 709/200 |
| 6,397,359 B1 | * | 5/2002 | Chandra et al. | 714/712 |
| 6,460,070 B1 | * | 10/2002 | Turek et al. | 709/202 |
| 6,473,794 B1 | * | 10/2002 | Guheen et al. | 709/223 |
| 6,570,844 B1 | * | 5/2003 | Deschaine | 370/217 |
| 6,662,308 B1 | * | 12/2003 | Baroni et al. | 714/4 |
| 2002/0076003 A1 | * | 6/2002 | Zellner et al. | 379/49 |

* cited by examiner

*Primary Examiner*—Salad Abdullahi
*Assistant Examiner*—El Hadji M Sall
(74) *Attorney, Agent, or Firm*—Marsh Fischmann & Breyfogle LLP; Kent A. Lembke; Jon P. Deppe

(57) ABSTRACT

A method and system for capturing and reporting debug information regarding data transport failures in a multi-level secure operating environment. A process available only to a trusted system administrator is activated causing probe activation. The data transport command is repeated. The process probes the locations where the data packets move across environment boundaries of the secure network. When the data stops being transported, the process captures the relevant information on the type of failure, its cause, the address where it occurred and the possible consequence. The captured information can then be displayed to an appropriately credentialed administrator through a password-protected command for debug. The probes are then deactivated.

8 Claims, 4 Drawing Sheets

DIAGNOSABILITY ENHANCEMENTS FOR MULTI-LEVEL SECURE OPERATING ENVIRONMENTS

BACKGROUND OF THE INVENTION

1. Field of the Invention

The present invention relates to the field of multi-level secure operating environments. Specifically, an embodiment of the present invention relates to a method and a system for diagnosing data transport failures in a multi-level secure operating environment.

2. Related Art

Over the past few decades, computer systems have become corporate-wide resources, essential for day-to-day operations. A wide range of information on new products, engineering data, employee compensation, health records, marketing and sales plans, and other sensitive data is often stored on these systems. Considerable cost, damage, and loss can be caused by hostile or unauthorized access and use of this sensitive information.

In order to control external access, firewalls and other systems are often used as gatekeepers. One method available for providing extensive internal protection against intruders and misuse is the multi-level secure operating environment. This environment allows system administrators to limit access to system and data resources by setting controls on all potential interactions with programs, file access, and utilities on a user-by-user basis.

Since information can have many levels of sensitivity, it is assigned a classification based on its sensitivity level. Within the multi-level secure operating environment, there exist controls that track information, which is assigned a classification to assure that the information, reaches only those destinations that are cleared for the same classification. There are various access controls used throughout the population of multi-level secure operating environments. One example of a multi-level secure operating environment control is a label-based access control that is automatically enforced by the system. In the case of label-based access controls, each data packet contains a label carrying information about the classification of the data in the packet and also the credentials or privileges of the process that generated the data.

There are some locations, e.g., users, within a distributed environment that have clearance to see information with a particular classification and some that are not. This is dependent upon the level of trust that has been assigned by a system administrator to each location within the environment. Therefore, there are instances in which a data packet never reaches its destination, not because of a hardware connectivity problem, but due to a security requirement that the data carries and for which the destination is not cleared. In a case of such a data transport failure, there is no "error" and, therefore, no error message generated. The system is not allowed to return a message regarding the data sensitivity issue that halted the data transport because such a message in itself constitutes sensitive information (e.g., a lower classified level can send information to a higher level, but cannot receive information back from the higher classified level). This creates a very difficult problem for the system administrator to diagnose. The troubleshooting paths, which a system administrator typically follows, will reveal no problem if the issue is not one of connectivity. Therefore there is no apparent way to determine what went wrong with the data packet.

SUMMARY OF THE INVENTION

Accordingly, a need exists for a method and system for capturing the detailed cause of data transport failures in a multi-level secure operating environment. What is also needed is a method that can satisfy the above need and report the captured information, while maintaining the security of the environment. The present invention provides a novel solution to these needs.

Specifically, one embodiment of the present invention provides a method and system for capturing and reporting the detailed cause of data transport failures in a multi-level secure operating environment. A process made available only to a trusted system administrator is activated. The data transport command is repeated. The process probes the locations where the data packets move across environment boundaries. When the data stops being transported due to a security breach of the access control policy, the process captures the relevant information on the type of failure, its cause, the address where it occurred and the possible consequences. The captured information can then be displayed to an appropriately credentialed administrator through a password-protected command. Once the problem is diagnosed, the probes that generated the relevant data are deactivated.

In another embodiment, the present invention includes a computer useable medium having computer-readable program code embodied therein for causing a computer to perform a process including activation of probes at access control decision points and enabling of error messages for multi-level trusted networking errors, and re-sending data packets, wherein the activated probes detect the address of the data transport failure and capture error messages for the transport failure, and wherein the process includes displaying the captured error messages.

According to one embodiment, the activation of the probes at access control decision points occurs in response to activation of a first command at a computer console and is restricted to users with appropriate privilege. Acquisition of the appropriate privilege may be enforced by user identification and password according to one implementation.

The enabling of error messages for multi-level trusted networking errors, according to one embodiment of the present invention, comprises activating debug-kernels to trace possible failures. The capturing of error messages in response to a transport failure may include the enabling of a troubleshooting mode in response to a detected failure. Activating a display of the error messages may be in response to activation of a second command. The activation may be restricted to users with appropriate privilege that is enforced by a user identification and password.

These and other advantages of the present invention will no doubt become obvious to those of ordinary skill in the art after having read the following detailed description of the preferred embodiments that are illustrated in the accompanying drawings.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Figure 1:
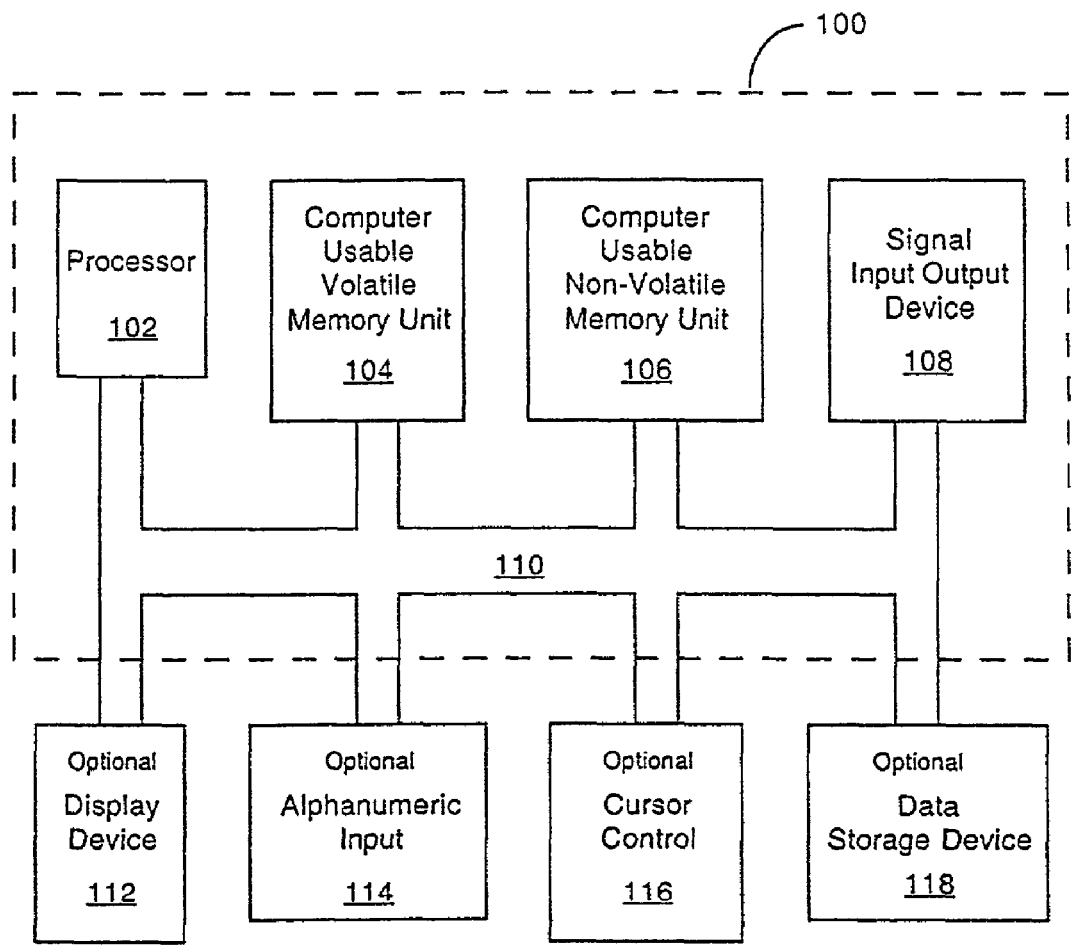
FIG. 1 is a block diagram of an exemplary computer system upon which embodiments of the present invention may be practiced.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Notation and Nomenclature

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic information capable of being stored, transferred, combined, compared, and otherwise manipulated in a computer system. It has proven convenient at times, principally for reasons of common usage, to refer to these information as transactions, bits, values, elements, symbols, characters, fragments, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "probing," "capturing," "routing", "displaying," "debugging," "stopping," "dropping out," "using," "extracting," "accumulating", "allowing" or the like, refer to actions and processes of a computer system or similar electronic computing device. The computer system or similar electronic computing device manipulates and transforms data represented as physical (electronic) quantities within the computer system memories, registers or other such information storage, transmission or display devices. The present invention is well suited to the use of other computer systems.

Exemplary Computer System

FIG. 1 is a block diagram of one embodiment of an exemplary computer system 100 used in accordance with the present invention. It should be appreciated that system 100 is not strictly limited to be a computer system. As such, system 100 of the present embodiment is well suited to be any type of computing device (e.g., data router, server computer, portable computing device, desktop computer, etc.). Within the following discussions of the present invention, certain processes and steps are discussed that are realized, in one embodiment, as a series of instructions (e.g., software program) that reside within computer readable memory units of computer system 100 and executed by a processor(s) of system 100. When executed, the instructions cause computer 100 to perform specific actions and exhibit specific behavior that is described in detail below.

Computer system 100 of FIG. 1 comprises an address/data bus 110 for communicating information and one or more central processors 102 coupled with bus 110 for processing information and instructions. Central processor unit(s) 102 may be a microprocessor or any other type of processor. The computer 100 also includes data storage features such as a computer usable volatile memory unit 104 (e.g., random access memory, static RAM, dynamic RAM, etc.) coupled with bus 110 for storing information and instructions for central processor(s) 102, a computer usable non-volatile memory unit 106 (e.g., read only memory, programmable ROM, flash memory, EPROM, EEPROM, etc.) coupled with bus 110 for storing static information and instructions for processor(s) 102. System 100 also includes one or more signal generating and receiving devices 108 coupled with bus 110 for enabling system 100 to interface with other electronic devices and computer systems. The communication interface(s) 108 of the present embodiment may include wired and/or wireless communication technology. For example, within the present embodiment, the communication interface 108 is a serial or parallel communication port, but could also alternatively be any of a number of well known communication standards and protocols, e.g., Universal Serial Bus (USB), Ethernet, FireWire (IEEE 1394), parallel, small computer system interface (SCSI), infrared (IR) communication, Bluetooth wireless communication, broadband, and the like.

Optionally, computer system 100 may include an alphanumeric input device 114 including alphanumeric and function keys coupled to the bus 110 for communicating information and command selections to the central processor(s) 102. The computer 100 can include an optional cursor control or cursor directing device 116 coupled to the bus 110 for communicating user input information and command selections to the central processor(s) 102. The cursor directing device 116 can be implemented using a number of well known devices such as a mouse, a track-ball, a track-pad, an optical tracking device, a touch screen, etc. Alternatively, it is appreciated that a cursor can be directed and/or activated via input from the alphanumeric input device 114 using special keys and key sequence commands. The present embodiment is also well suited to directing a cursor by other means such as, for example, voice commands. The system 100 can also include a computer usable mass data storage device 118 such as a magnetic or optical disk and disk drive (e.g., hard drive or floppy diskette) coupled with bus 110 for storing information and instructions. An optional display device 112 is coupled to bus 110 of system 100 for displaying video and/or graphics. It should be appreciated that optional display device 112 may be a cathode ray tube (CRT), flat panel liquid crystal display (LCD), field emission display (FED), plasma display or any other display device suitable for displaying video and/or graphic images and alphanumeric characters recognizable to a user.

Figure 2:
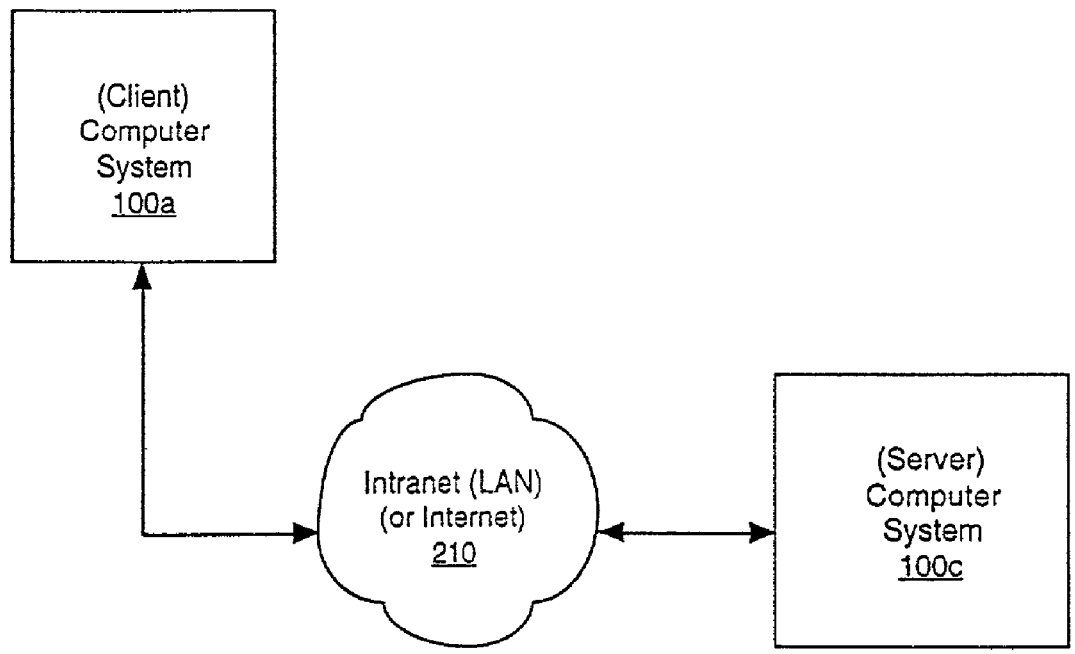
FIG. 2 is a block diagram illustrating an exemplary network of communicatively coupled devices upon which embodiments of the present invention may be practiced.

FIG. 2 is a block diagram of computer systems 100a and 100c coupled in an exemplary network 200 upon which embodiments of the present invention can be implemented. The computer systems 100a and 100c may be physically in separate locations (e.g., remotely separated from each other). It is appreciated that the present invention can be utilized with any number of computer systems.

Network 200 may represent a portion of a communication network located within a firewall of an organization, corporation or financial institution (an "Intranet"), or network 200 may represent a portion of the World Wide Web or Internet 210. The mechanisms for coupling computer systems 100a and 100c over the Internet (or Intranet) 210 are well known in the art. In the present embodiment, multi-level secure operating environment protocols like Trusted Solaris 8, manufactured by Sun Microsystems, Inc. or other multi-level secure operating environments may be used in conjunction with IP (Internet Protocol), TCP (Transmission Control Protocol), HTTP (HyperText Transfer Protocol) and SSL (Secure Sockets Layer) to transport data between clients and servers or between servers and servers, in either direction. However, the coupling of computer systems 100a and 100c can be accomplished over any network protocol that supports a network connection, including NetBIOS, IPX (Internet Packet Exchange), and LU6.2, and link layers protocols such as Ethernet, token ring, and ATM (Asynchronous Transfer Mode). Computer systems 100a and 100c may also be coupled via their respective input/output ports (e.g., serial ports) or via wireless connections (e.g., according to IEEE 802.11b).

Figure 3:
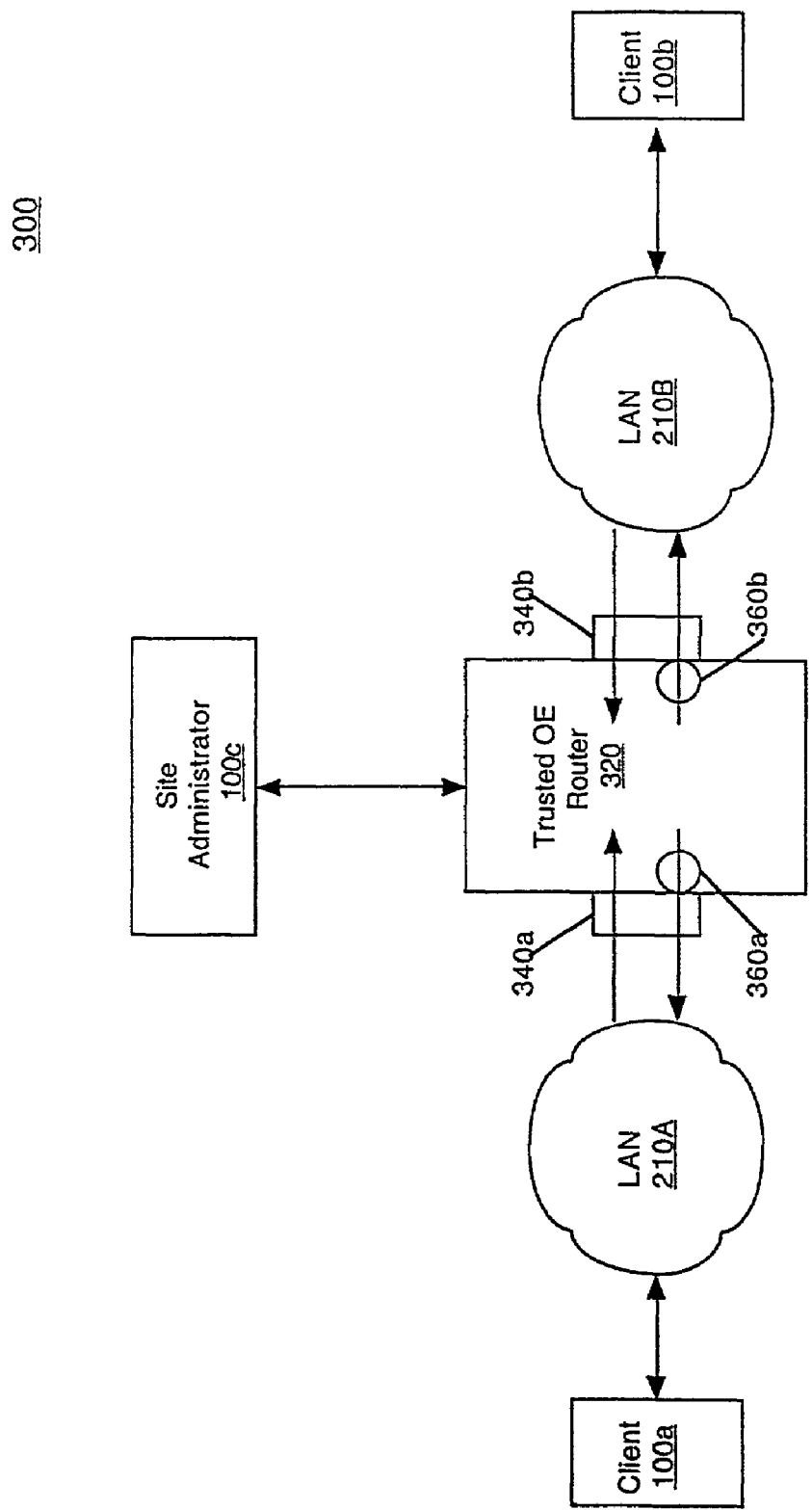
FIG. 3 is a block diagram illustrating an exemplary multi-level secure operating environment of communicatively coupled devices upon which one embodiment of the present invention may be practiced.

FIG. 3 is a block diagram illustrating an exemplary multi-level secure operating environment 300 of communicatively coupled devices upon which one embodiment of the present invention may be practiced. It is understood that there are a wide variety of ways that client devices can be coupled in a multi-level secure operating environment, and that the present embodiment is only one example. Currently, one example of a multi-level secure operating environment is the Trusted Solaris™ 8, produced by Sun Microsystems. According to one embodiment, client device 100a is coupled to client device 100b through local area network (LAN) 210A, router interface 340a, multi-level secure trusted operating environment router 320, interface 340b, and LAN 210B. A site administrator device 100c is coupled to trusted operating environment router 320 with communication routes to client device 100a via router 320, interface 340a and LAN 210A and to client device 100b via router 320, interface 340b and LAN 210B.

In a multi-level secure operating environment, the security attributes of information passed between client devices 100a and 100b are checked whenever the data passes an access control decision point such as 360a and 360b. It should be understood that there are many access control decision points throughout the operating environment and that decision points 360a and 360b are only exemplary of locations where access control decisions are made.

In a multi-level secure operating environment, according to one embodiment, information is classified according to its level of sensitivity and, throughout the operating environment there are access controls that function to make sure that highly sensitive information does not reach areas without proper classification for receiving it. To satisfy these requirements, each data packet contains codes regarding the level of sensitivity of the data and of the source of the data packet. The controls are enforced by interfaces with multi-level secure trusted routers such as router 320. Interfaces 340a and 340b are classified to allow traffic to pass only if it contains the proper classification based on a defined security policy of the overall network. Packets of information that are traveling in a multi-level secure environment contain labels with their classification. When these data packets pass an access control decision point (e.g., 360a and 360b), their label is read and a decision is made as to whether their classification is in the set of classifications permitted to pass that control point.

For example, if a packet of information with a classification of secret is sent from client device 100a destined for client device 100b, interface 340a has a confidential-to-secret clearance and interface 340b has a secret-to-secret clearance, the data packet is allowed to pass. However, if the packet of information has a confidential classification, which is lower than a secret classification, the packet will be stopped at access control point 360a and not allowed to pass. According to one policy, there will be no message sent to client device 100a apprising of the failure to transport data or of the cause, as this would reveal a higher classification of information than client device 100a is cleared to receive. In such a case, it would be likely that the user of client device 100a or 100b would contact a site administrator to locate the cause of the data transport failure.

According to one embodiment of the present invention, a privileged site administrator would log onto the site administrator device 100c and activate a secure process that is an embodiment of the present invention for capturing specific information regarding the fate of the data packet. This secure process is shown in FIG. 4.

With reference to FIG. 3, special software integrated within interfaces 340a and 340b enforce the security policy of the multi-level secure environment. The embodiments of the present invention identify software or firmware decision points that function to stop data packets that violate the security policy. The embodiments place special software or firmware "probes" at these decision points. The probes can be remotely activated by an authorized site administrator. When activated, the probes gather information regarding any data packet that is denied passage through an interface due to a violation in the security policy of the network. This information can be obtained by the authorized administrator who can also deactivate the probes.

Figure 4:
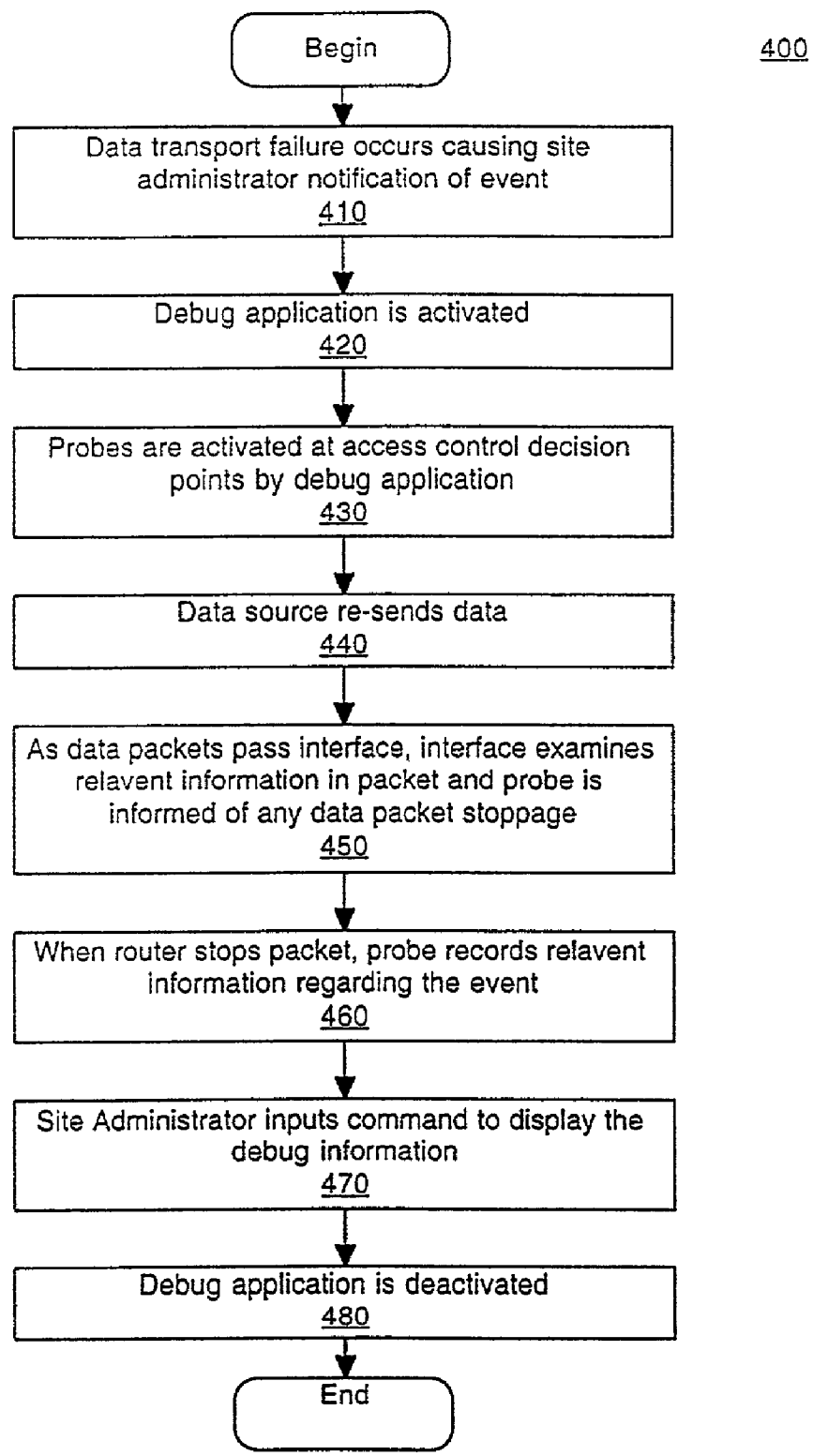
FIG. 4 is a flow diagram illustrating a computer controlled method for locating and capturing the cause of data transport failures in accordance with one embodiment of the present invention.

FIG. 4 is a flow diagram illustrating a computer controlled method 400 for locating and capturing the cause of data transport failures in accordance with one embodiment of the present invention, using the probes described above. Although specific steps are disclosed in flow diagram 400, such steps are exemplary. That is, the present invention is well suited to performing various other steps or variations of the steps recited in FIG. 4.

At step 410, a data transport failure, as described above with respect to FIG. 3, has occurred. In accordance with one embodiment of the present invention, a site administrator with all the privileges and authority to access the various levels of the multi-level secure operating environment logs onto a site administrator device 100c (FIG. 3) and, with appropriate user identification and password, is able to activate a debug process as shown in step 420. Table 1 below illustrates one example of pseudo code that could be used within a Trusted Solaris™ secure operating environment as provided by Sun Microsystems for activating a debug process:

TABLE 1

When the Solaris ip_debug is turned on, using the command ndd:
/usr/sbin/ndd -set /dev/ip ip_debug 1

The debug process is typically activated in response to a user's complaint stemming from a transport failure. At step 430, according to one embodiment, probes are activated at access control decision points (e.g., 360a and 360b of FIG. 3) to enable error messages for multi-level trusted networking errors. This is accomplished by activating kernels to trace possible failures. In one embodiment, the probes monitor threads of the interface that are responsible for enforcing the security policy of the network. When activated, these probes record events corresponding to data packets that are stopped due to security policy violations.

In step 440, the data source (e.g., client device 100a of FIG. 3) sends the data again with probes activated. As shown in step 450 of process 400, according to one embodiment of the present invention, the probes that were activated in step 430 examine information in data packets as they pass by the access control decision points 360a and 360b.

In step 460, according to one embodiment, when router 320 stops a data packet, in a Trusted Solaris™ secure operating environment for example, the system will log messages (as a result of the probes capturing data) for all the cases of failure using the pseudo code, "strlog (9F)". The messages logged may include the identification number of the packet, a description of the failure (e.g., destination unreachable), the cause of failure (e.g., accreditation check, missing template, security failure/improper authorization or mandatory access control (MAC) violation), the destination address of the packet, and the consequences (e.g., possible packet dropping). It should be understood that there are many messages that could be logged and those listed above are shown as exemplary.

In step 470, according to one embodiment of the present invention, the Site Administrator, with appropriate privileges, userid and password, inputs a command to display the information at device 100c (FIG. 3) that identifies the location and cause of the data transport failure. Table 2 below illustrates one example of pseudo code that could be used within a Trusted Solaris™ secure operating environment as provided by Sun Microsystems for displaying the debug messages. In this example, client device (e.g., 100b of FIG. 3) is labeled "12.15.13.005" and its clearance is unlab_conf (unlabeled confidential). If a process transmitting data labeled secret tries to reach it, the data will be stopped. Using the pseudo code command, "strace", the error massages in Table 2 below may be displayed. The error messages indicate that a data packet number 58929, destined for location 12.15.13.005, was stopped due to a violation of the security policy that is enforced at an interface (e.g., interfaces 340a and 340b).

TABLE 2

000001 15:04:55 000d3070 0 ..E 5701 0 genunix_policy: [ID 589292 kern.debug]
Destination 12.15.13.005 unreachable: Label out of range.

In response to an error message such as that of Table 2 above, the site administrator may decide that one or more changes in the security policy or the authorization levels of the sender/receiver should be made. Alternatively, the administrator may decide that the system is operating as it was intended and that the data packet was properly stopped, and the administrator will then take appropriate administrative action.

At step 480, in accordance with one embodiment of the present invention, the debug application is deactivated by a command from the site administrator console 100c. Once step 480 is complete, flowchart 400 is exited.

Accordingly, what is presented is a method for capturing the detailed cause of data transport failures in a multi-level secure operating environment while maintaining the security of the environment The preferred embodiment of the present invention, diagnosability enhancements for multi-level secure operating environments, is thus described. While the present invention has been described in particular embodiments, it should be appreciated that the present invention should not be construed as limited by such embodiments, but rather construed according to the below claims.

What is claimed is:

1. A method for diagnosing transport failures of a data packet in a multi-level secure network, said method comprising:
    a) remotely activating a software-based probe at an access control decision point of said network in response to an activation of a first command at a debug station, wherein said software-based probe is capable of identifying an error message for a multi-level trusted networking error, and said access control decision point being an interface in said network that is responsible for enforcing a security policy;
    b) detecting a data transport failure of said data packet being transmitted between two or more computer systems, said detection using a kernel program operating on a microprocessor to trace the data transport failure, said data transport failure resulting from a violation of a security policy of said network;
    c) identifying an error message in response to said data transport failure, said identifying being facilitated by said software-based probe that is configured to monitor threads of at the interface, said error message comprising information identifying said data packet and indicating a cause of said data transport failure;
    d) displaying said error message at said debug station of said network in response to activation of a second command at the debug station;
    e) restricting said activation of said second command to users of an appropriate authority, wherein enforcing said restricting comprises requiring a predetermined user identification and password, and
    f) remotely deactivating the software-based probe upon diagnosing transport failures so as to allow the network to operate without the software-based probe being activated.

2. The method as described in claim 1 further comprising restricting said activation of first command to users of an appropriate authority.

3. The method as described in claim 2 further comprising enforcing said restricting by requiring a predetermined user identification and password.

4. A multi-level secure network system comprising:
    a router comprising a plurality of interfaces for passing data packets there through and for enforcing a security policy on said data packets;
    a plurality of software-based probes associated with said interfaces, said plurality of software-based probes configured for detecting data packet transmit failures between two or more computer systems linked by said router resulting from a violation of a security policy enforced by said interfaces and for identifying information associated with said data packet transmit failures, the detecting using a kernel program operating on a microprocessor to trace the data transport failure by monitoring threads one or more of the plurality of interfaces of the router; and a debug console for remote activating and remote deactivating said software-based probes, the activating through the debug console defining which of the plurality of interfaces of the router should be active with the software-based probes, the debug console displaying said information, and the remote deactivating of the software-based probe enabling operation of the interface without the kernel program tracing threads;

wherein said debug console displays said information in response to a second command and use of said second command is restricted based on user identification and password at said debug console.

5. The network system as described in claim 4 wherein said debug console activates said plurality of software-based probes in response to a first command.

6. The network system as described in claim 5 wherein use of said first command is restricted based on user identification and password at said debug console.

7. The network system as described in claim 4 wherein said interfaces enforce said security policy on said data packets by stopping any data packet that violates said security policy.

8. The network system as described in claim 7 wherein, in response to a data packet stopped, a software-based probe of said plurality of software-base probes generates an information identifying said data packet stopped and a cause thereof.

* * * * *